United States Patent
Ito et al.

(10) Patent No.: US 7,037,352 B2
(45) Date of Patent: May 2, 2006

(54) POLISHING PARTICLE AND METHOD FOR PRODUCING POLISHING PARTICLE

(75) Inventors: Katsura Ito, Nagano (JP); Hiroshi Saegusa, Nagano (JP); Tomoyuki Masuda, Nagano (JP); Fumio Imai, Nagano (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 519 days.

(21) Appl. No.: 10/012,313

(22) Filed: Dec. 12, 2001

(65) Prior Publication Data

US 2002/0129559 A1 Sep. 19, 2002

Related U.S. Application Data

(60) Provisional application No. 60/283,136, filed on Apr. 12, 2001, and provisional application No. 60/267,197, filed on Feb. 8, 2001.

(30) Foreign Application Priority Data

Dec. 12, 2000 (JP) .................................. P2000-378119
Apr. 5, 2001 (JP) .................................. P2001-107311

(51) Int. Cl.
*C09C 1/68* (2006.01)

(52) U.S. Cl. .............................. 51/307; 51/308; 51/309

(58) Field of Classification Search ................ 106/3; 51/307–309; 423/263
See application file for complete search history.

(56) References Cited

U.S. PATENT DOCUMENTS 6,454,820 B1 * 9/2002 Hagihara et al. ............. 51/308

FOREIGN PATENT DOCUMENTS

| EP | 0 357 989 A1 | 3/1990 |
|---|---|---|
| EP | 0 941 973 A2 | 9/1999 |
| JP | 8-252766 A | 10/1996 |
| JP | 8-252766 * | 10/1996 |
| JP | 2000-163740 A | 6/2000 |
| JP | 2001-062705 A | 3/2001 |
| JP | 2001-323254 A | 11/2001 |
| WO | WO 96/34828 A1 | 11/1996 |

OTHER PUBLICATIONS

Patent Abstract of Japan, Nakajima et al JP 8–252766 Oct. 1, 1996.*
Patent Abstracts of Japan, abstracting JP 2000–163740, Jun. 16, 2000.
Patent Abstracts of Japan, abstracting JP 8–252766, Oct. 01, 1996.
Patent Abstracts of Japan, abstracting JP 2001-323254, Nov. 22, 2001.
Patent Abstracts of Japan, abstracting JP 2001-062705, Mar. 13, 2001.

* cited by examiner

*Primary Examiner*—J. A. Lorengo
*Assistant Examiner*—S. S. Manlove
(74) *Attorney, Agent, or Firm*—Sughrue Mion, PLLC

(57) ABSTRACT

By providing an abrasive having a ratio of volume-cumulative (95%) average particle size (D95) to volume-cumulative (50%) average particle size (D50) (D95/D50) falling within a range of 1.2 to 3.0 or an abrasive having a volume-cumulative (95%) average particle size (D95) falling within a range of 0.1–1.5 μm and containing coarse particles having a size more than 10 times the volume-cumulative (50%) average particle size (D50) in an amount, based on the total mass of all the particles, of 1 mass % or less, there can be provided an abrasive, an abrasive slurry, a method for producing an abrasive, and a polishing method which attain, during accurate polishing of substrates such as electronics substrates, a high removal rate and a high-quality surface; i.e., a surface having a high flatness, low surface roughness, and substantially no microscratches or micropits.

25 Claims, No Drawings

POLISHING PARTICLE AND METHOD FOR PRODUCING POLISHING PARTICLE

CROSS REFERENCE TO RELATED APPLICATIONS

The present application is filed under 35 U.S.C. §111(a), and claims benefit, pursuant to 35 U.S.C. §119(e)(1), of the filing dates of Provisional Application No. 60/267,197 filed Feb. 8, 2001 and Provisional Application No. 60/283,136 filed Apr. 12, 2001, pursuant to 35 U.S.C. §111(b).

FIELD OF THE INVENTION

The present invention relates to an abrasive for use in accurate polishing of optical device substrates or electronics substrates such as glass substrates for producing optical lenses, optical disks, magnetic disks, plasma-display devices, liquid crystal devices, and LSI photomasks. More particularly, the invention relates to an abrasive slurry which is endowed with excellent polishing properties including removal rate (polishing speed) and which allows an object to be polished without generating substantial surface defects such as scratches.

BACKGROUND OF THE INVENTION

In recent years, polishing technique has become more and more important in the fields of electronics substrates such as glass substrates for magnetic disks; glass substrates for liquid crystal displays such as thin-film transistor (TFT) type LCDs and twisted nematic (TN) type LCDs; and glass substrates for color filters of liquid crystal television displays and LSI photomasks.

Particularly, in the field of magnetic disk substrates, there is demand for high mechanical performance, particularly high rigidity, so as to reduce the thickness of the substrates in keeping with the trend in weight reduction and to withstand deformation of the disk during high-speed rotation. In addition, there is also strong demand for high recording density. In order to attain high recording density, the flying height of a magnetic head to a magnetic disk substrate has been reduced to a very low height. In order to attain such a low height, the magnetic disk substrates must have high flatness and small surface roughness; i.e., a mirror surface level, and surface defects such as microscratches and micropits must be removed to the utmost. Thus, surface polishing must be performed at high accuracy. In order to meet the aforementioned demands for reduced thickness, high mechanical performance, and high recording density, various improvements have been made to the chemical composition of glass and to the method for producing glass. Specifically, in addition to chemically reinforced glass, there have conventionally been developed, as glass substrates, glass-ceramic. substrates predominantly containing lithium silicate and glass-ceramic substrates containing quartz crystals as a major component. However, these glass substrates have considerably poor processability, and therefore, when a conventional abrasive is used to polish such substrates, processing speed is low, to thereby deteriorate productivity.

Conventionally, in order to perform surface-polishing of a glass substrate, there has been employed an abrasive predominantly comprising a rare earth metal oxide, inter alia, cerium oxide, since cerium oxide exhibits a removal rate several times that of iron oxide, zirconium oxide, or silicon dioxide. During use of such an abrasive, abrasive particles are generally dispersed in liquid such as water. When such an abrasive is used to perform surface-polishing, there are demands for attaining both the aforementioned highly accurate surface polishing performance and a high removal rate.

A variety of measures for increasing the removal rate are disclosed for the case where cerium oxide is used as an abrasive. For example, Japanese Patent Publication (kokoku) No. 38-3643 discloses a polishing method in which colloidal silica, alumina, or a similar substance is added to cerium oxide or a similar substance. Japanese Patent Application laid-Open (kokai) No. 3-146585 discloses an abrasive which comprises cerium oxide as a predominant component and magnesium chloride. However, employment of a sol-form abrasive comprising particles of different species leads to an increase in surface scratches or pits, failing to yield a high-quality surface.

Japanese Patent Application laid-Open (kokai) No. 8-3541 discloses a ceria sol alkaline abrasive containing an organic acid having at least two carboxyl groups for attaining a high-quality surface. Japanese Patent Application laid-Open (kokai) No. 8-41443 discloses a polishing composition containing an abrasive having an average particle size of 0.1–10 µm (2–30 parts by mass) and an alkyl sulfate salt and/or a polyoxyethylene monofatty acid ester (1–20 parts by mass). By employment of such abrasives, highly accurate polishing and polishing performance can be attained simultaneously to a certain degree. However, since a large amount of an organic substance must be employed in addition to abrasive particles, production costs increase and a high-quality surface is difficult to attain, making employment of such abrasives problematic.

SUMMARY OF THE INVENTION

The present invention has been accomplished in order to solve the aforementioned problems, and an object of the present invention is to provide an abrasive, an abrasive slurry, a method for producing an abrasive, a polishing method, and a polished glass substrate for magnetic disks which attain, during accurate polishing of electronics substrates and similar substrates, a high removal rate and provide a high-quality surface; i.e., a surface having a high flatness, low surface roughness, and substantially no microscratches or micropits.

Accordingly, the present invention provides the following.

(1) An abrasive having a ratio of average particle size corresponding to a 95% cumulative volume as determined from the particle size distribution curve (hereinafter referred to simply as "volume-cumulative (95%) average particle size (D95)") to volume-cumulative (50%) average particle size (D50) (D95/D50) falling within a range of 1.2 to 3.0.

(2) An abrasive having a D95 falling within a range of 0.1–1.5 µm and containing coarse particles having a size more than 10 times D50 in an amount, based on the total mass of all the particles, of 1 mass % or less.

(3) An abrasive as described in (1) or (2), wherein the D50 falls within a range of 0.01 to 10 µm.

(4) An abrasive as described in (1) or (2), which has a specific surface area falling within a range of 1–50 m$^2$/g.

(5) An abrasive as described in (1) or (2), which contains, as a predominant component, at least one species selected from the group consisting of cerium oxide, silicon oxide, iron oxide, aluminum oxide, titanium oxide, chromium oxide, manganese oxide, silicon carbide, and diamond.

(6) An abrasive as described in (1) or (2), which contains, as a predominant component, at least one species selected from the group consisting of cerium oxide, silicon oxide, iron oxide, aluminum oxide, and titanium oxide.

(7) An abrasive as described in (1) or (2), which contains, as a predominant component, cerium oxide produced from a rare earth metal carbonate serving as a starting material.

(8) An abrasive as described in (1) or (2), which contains a predominant component in an amount of at least 50 mass %.

(9) An abrasive slurry containing an abrasive as recited in (1) or (2) in an amount falling within a range of 1–50 mass %. (10) An abrasive slurry as described in (9), which has a pH in excess of 10.

(11) An abrasive slurry as described in (9), which has an electrical conductivity of at least 2 mS/cm as measured at 20° C. under an abrasive concentration of 20 mass %.

(12) An abrasive slurry as described in (9), which has an electrical conductivity of at least 3 mS/cm as measured at 20° C. under an abrasive concentration of 20 mass %.

(13) An abrasive slurry as described in (9), which contains a surfactant.

(14) An abrasive slurry as described in (9), which contains at least one species selected from the group consisting of an anionic surfactant and a nonionic surfactant.

(15) An abrasive slurry as described in (9), which contains, as an anionic surfactant, at least one species selected from the group consisting of low-molecular compounds and high-molecular compounds of a carboxylate salt, a sulfonate salt, a sulfate ester salt, or a phosphate ester salt.

(16) An abrasive slurry as described in (9), which contains, as an nonionic surfactant, at least one species selected from the group consisting of a polyoxyethylene alkylphenol ether, a polyoxyethylene alkyl ether, and a polyoxyethylene fatty acid ester.

(17) An abrasive slurry as described in (9), which contains, as a solvent, at least one species selected from the group consisting of water, a C1–C10 monohydric alcohol, a glycol, a C1–C10 polyhydric alcohol, dimethyl sulfoxide, dimethylformamide, tetrahydrofuran, and dioxane.

(18) An abrasive slurry as described in (9), which contains at least one species selected from the group consisting of a phosphate salt, a cellulose ether, and a water-soluble polymer.

(19) A method for producing an abrasive comprising a step of drying an abrasive slurry as recited in (9) and a step of pulverization.

(20) A method for producing an abrasive comprising a step of drying an abrasive slurry as recited in (9) and a step of pulverization, wherein the step of drying employs a fluidization-medium drier or a spray drier.

(21) A method for producing an abrasive comprising a step of drying an abrasive slurry as recited in (9) and a step of pulverization, wherein the step of drying is performed in a manner in which the abrasive slurry is fed into a fluidization-medium layer of a fluidization-medium drier or in a manner in which the abrasive slurry is sprayed into a hot blast provided in a spray drier.

(22) A polishing method comprising polishing, by use of an abrasive slurry as recited in (9), a substrate selected from the group consisting of glass substrates for an optical lense, an optical disk, a plasma-display device, a liquid crystal device, a color filter for a liquid crystal television, and an LSI photomask.

(23) A polishing method comprising polishing, by use of an abrasive slurry as recited in (9), a glass substrate for a magnetic disk.

(24) A glass substrate for a magnetic disk having a surface roughness (Ra) of 4.7 Å or less and a relative incidence of scratches of 55 or less.

DETAILED DESCRIPTION OF THE INVENTION

The abrasive of the present invention is required to have a ratio of a volume-cumulative (95%) average particle size (D95) to a volume-cumulative (50%) average particle size (D50) (D95/D50) falling within the range of 1.2 to 3.0, preferably 1.3 to 2.6, more preferably 1.5 to 2.3. When the ratio (D95/D50) is less than 1.2, a desirable removal rate cannot be attained, and difficulty involved in grinding technique increases, failing to provide polished products of desired quality. In contrast, when the ratio D95/D50 is greater than 3.0, polished products having substantially no surface defects are difficult to obtain. In other words, there cannot be attained a polished product surface having considerably high flatness and very small surface roughness and a surface condition such that no substantial microscratches or micropits are generated.

As used herein, the expression "volume-cumulative (95%) average particle size (D95)" refers to an average particle size of particles included in a 95% cumulative volume as determined from the undersize particle distribution. Similarly, the expression "volume-cumulative (50%) average particle size (D50)" refers to an average particle size of particles included in a 50% cumulative volume as determined from the undersize particle distribution.

In the present invention, the reason for employment of the aforementioned volume-cumulative (95%) average particle size (D95) instead of the volume-cumulative (100%) average particle size (D100) is that the volume-cumulative (95%) average particle size can be measured in an easy manner and measurement of the volume-cumulative (100%) average particle size (D100) requires a long period of time. Another reason is that no substantial problem arises when D95 is employed instead of D100. Thus, D95 is employed as an alternative to the ideal volume-cumulative (100%) average particle size (D100).

Abrasive particles having a ratio D95/D50 close to 1 are regarded to exhibit a sharp size distribution profile. Since the abrasive of the present invention has a ratio D95/D50 falling within the range of 1.2 to 3.0, it is regarded as an abrasive exhibiting a quite sharp size distribution profile. The volume-based particle size distribution can be obtained by use of a particle size distribution measurement apparatus employing laser diffraction or by use of a particle size distribution measurement apparatus employing dynamic light scattering, photon correlation, or the like.

The abrasive of the present invention has a volume-cumulative (95%) average particle size (D95) of 0.1–1.5 µm and contains coarse particles having a size more than 10 times the volume-cumulative (50%) average particle size (D50) in an amount, based on the total mass of all the particles, of 1 mass % or less, preferably 0.5 mass % or less, more preferably 0.5–0.001 mass %.

When the amount of coarse particles, based on the total mass of all the particles, is in excess of 1 mass %, polished products having no substantial surface defects are difficult to obtain. In other words, there cannot be attained a polished product having a surface of considerably high surface flatness, low surface roughness, and having no substantial microscratches or micropits.

The coarse particle content can be obtained through any method; e.g., a method in which a portion of a slurry produced from a relevant abrasive is taken up; the portion is repeatedly subjected to centrifugal separation under centrifugal sedimentation conditions including centrifugal force and centrifugation time predetermined in accordance with the particle size which is 10 times D50; and the thus-separated coarse particles are removed for measuring the content. Alternatively, the content may be obtained through a method employing a commercial coarse particle size meter.

The abrasive slurry employing the abrasive of the present invention is required to have a pH preferably higher than 10, more preferably higher than 11. A pH of 10 or lower results in failing to attain a desirable removal rate.

The clear reason why the excellent effects of the present invention are attained through employment of the constitution of the present invention has not been elucidated. However, a conceivable reason is that the size and amount of the particles of a larger size contained in the abrasive slurry; i.e., the portion of greater size in the particle size distribution, largely determines the removal rate and polishing accuracy, and that the pH of the slurry is an important factor during reaction of hydroxyl groups remaining on the surface of abrasive grains and hydroxyl groups remaining on the surface of a glass material to be polished.

The abrasive of the present invention contains a predominant component which is preferably at least one species selected from among cerium oxide, silicon oxide, iron oxide, aluminum oxide, titanium oxide, manganese oxide, chromium oxide, silicon carbide, and diamond.

More preferably, the abrasive of the present invention contains a predominant component which is at least one species selected from among cerium oxide, silicon oxide, iron oxide, aluminum oxide, and titanium oxide.

Among these components, at least one predominant component is contained preferably in an amount of 50 mass % or more, more preferably 70 mass %. In this case, no particular limitation is imposed on the balance component.

In the present invention, among the aforementioned abrasive components, cerium oxide is particularly preferably employed as a predominant component. More preferably, the cerium oxide serving as a predominant component is produced from a rare earth metal carbonate serving as a starting material. The abrasive containing cerium oxide which has been through the above method and serves as a predominant component preferably has a cerium oxide content of 50 mass % or more, more preferably 70 mass % or more. The rare earth metal carbonate is employed as a type of light rare earth metal compounds which predominantly contain cerium and reduced amounts of components other than rare earth metals; e.g., alkali metals.

The rare earth metal carbonate to be employed as a starting material is obtained by milling naturally occurring rare earth concentrate rich in cerium, lanthanum, praseodymium, neodymium, etc.; chemically separating and removing components other than rare earth metals such as alkali metals, alkaline earth metals, and radioactive substances; and forming a carbonate salt by use of a substance such as ammonium bicarbonate or oxalic acid.

The thus-obtained rare earth metal carbonate is fired at about 500° C. to about 1,200° C. in an electric furnace or a similar apparatus, to thereby form fired powder, and the powder is milled, to thereby produce an abrasive predominantly containing cerium oxide. The degree of firing can be judged on the basis of the specific surface area. The specific surface area is preferably 1–50 m$^2$/g, particularly preferably 2–20 m$^2$/g.

The abrasive according to the present invention has an average particle size (D50) falling within the range of 0.01 μm to 10 μm, preferably 0.05 μm to 5 μm, more preferably 0.1 μm to 2 μm, most preferably 0.1 μm to 1.5 μm. When the average particle size is less than 0.01 μm, a sufficient removal rate is difficult to attain, whereas when the particle size is in excess of 10 μm, polished products are readily scratched, and problematic sedimentation of the abrasive slurry readily occurs.

In the present invention, by appropriately choosing conditions such as firing conditions and milling conditions for production, there can be obtained an abrasive having a specific particle size distribution which attains the effect of the present invention.

The abrasive slurry of the present invention may be produced through any method. For example, fired powder is dispersed in water, a water-soluble organic solvent, or a similar medium, and the fired powder is wet-milled in the dispersion medium. Alternatively, fired powder is dry-milled, and the resultant powder is wet-dispersed in water. However, in the present invention, a wet milling process carried out by use of, for example, a ball mill is desirably employed. Examples of the water-soluble organic solvent include C1–C10 monohydric alcohols such as methanol, ethanol, propanol, isopropanol, and butanol; C3–C10 polyhydric alcohols such as ethylene glycol and glycerin; acetone; dimethyl sulfoxide (DMSO); dimethylformamide (DMF); tetrahydrofuran; and dioxane.

The abrasive slurry of the present invention has an abrasive concentration (slurry concentration) of 1–50 mass %, preferably 5–40 mass %, more preferably 10–30 mass %. When the amount of the abrasive in the slurry is less than 1 mass %, sufficient polishing performance is difficult to attain, whereas when the amount is in excess of 50 mass %, the viscosity of the slurry increases, leading to poor flowability. This readily causes a problem in production and economically disadvantageous, in view of excessive use of abrasive.

The dispersion medium preferably used for preparing the abrasive slurry of the present invention is at least one species selected from among water; C1–C10 monohydric alcohols such as methanol, ethanol, propanol, isopropanol, and butanol; glycols such as ethylene glycol and polyethylene glycol; C1–C10 polyhydric alcohols such as glycerin; dimethyl sulfoxide (DMSO); dimethylformamide (DMF); tetrahydrofuran; and dioxane. Of these, water, alcohol, and glycol are preferably used.

Preferably, the abrasive slurry of the present invention has an electrical conductivity of at least 2 mS/cm, more preferably at least 3 mS/cm, as measured at 20° C. When the electrical conductivity is at least 2 mS/cm, desired polishing performance (e.g., desired surface roughness, scratches, surface defects of a substrate) can be attained.

The abrasive slurry of the present invention preferably contains a surfactant serving as a dispersant. Examples of the surfactants preferably used in the present invention include anionic surfactants, cationic surfactants, nonionic surfactants, and amphoteric surfactants. These surfactants may be used singly or in combination of two or more species. Of these, surfactants such as anionic surfactants and nonionic surfactants are preferred in the present invention.

Examples of the anionic surfactants include known carboxylate salts (e.g., soap, N-acylamino acid salts, alkyl ether carboxylate salts, acylated peptides); sulfonate salts (e.g., alkanesulfonate salts (including alkylbenzenesulfonate salts) and alkylnaphthalenesulfonate salts, sulfosuccinate salts, α-olefinsulfonate salts, N-acylsulfonate salts); sulfate ester salts (e.g., sulfonated oil, alkyl sulfate salts, alkyl ether sulfate salts, alkyl allyl ether sulfate salts, alkylamide sulfate salts); and phosphate ester salts (e.g., alkyl phosphate salts, alkyl ether phosphate salts, alkyl allyl ether phosphate salts). These salts may have a low molecular weight or a high molecular weight. As used herein, the term "salt" refers to at least one salt selected from among Li salts, Na salts, K salts, Rb salts, Cs salts, ammonium salts, and H-type species.

For example, the soap is an C12–C18 fatty acid salt generally having a fatty acid moiety derived from lauric acid, myristic acid, palmitic acid, stearic acid, etc. Examples of the N-acylamino acid salts include C12–C18 N-acyl-N-methylglycine salts and N-acylglutamate salts. Examples of the alkyl ether carboxylate salts include those having 6 to 18 carbon atoms and examples of the acylated peptides include those having 12 to 18 carbon atoms. Examples of the sulfonate salts include those mentioned above and having 6 to 18 carbon atoms. For example, when the corresponding acid is an alkanesulfonic acid, examples of the acid include laurylsulfonic acid, dioctylsuccinosulfonic acid, benzenesulfonic acid, dodecylbenzenesulfonic acid, myristylsulfonic acid, quelylbenzenesulfonic acid, and stearylsulfonic acid. Examples of the sulfate ester salts include those mentioned above and having 6 to 18 carbon atoms. For example, when the corresponding acid is an alkyl sulfuric acid, examples of the acid include lauryl sulfuric acid, dioctylsuccinosulfuric acid, myristyl sulfuric acid, and stearyl sulfuric acid. Examples of the phosphate ester salts include those mentioned above and having 8 to 18 carbon atoms. Examples of the nonionic surfactants include polyoxyethylene alkyl phenol ethers, polyoxyethylene alkyl ethers, and polyoxyethylene fatty acid esters. In addition to the aforementioned anionic surfactants and nonionic surfactants, known fluorine-containing surfactants may also be used.

Examples of high polymer surfactants include a specific polycarboxylic acid compound (Poiz 530, product of Kao Corporation).

In order to prevent sedimentation of the abrasive slurry of the present invention or enhance stability of the slurry, the abrasive slurry composition of the present invention may further contain, in addition to the aforementioned surfactants, additives such as polymer dispersants, e.g., a tripolyphosphate salt; phosphate salts, e.g., hexametaphosphate salts; cellulose ethers, e.g., methyl cellulose and carboxymethyl cellulose; and water-soluble polymers, e.g., poly(vinyl alcohol). Generally, these additives are added to the abrasive preferably in amounts of 0.05–20 mass %, particularly preferably 0.1–10 mass %.

The abrasive of the present invention can be obtained also by drying the abrasive slurry of the present invention. No particular limitation is imposed on the drying method so long as secondary aggregation of abrasives contained in the slurry during drying can be prevented. Thus, a drier of a type which prevents secondary aggregation of abrasive; e.g., a medium-fluidization drier or a spray drier, is preferably used. The medium-fluidization drier is a type of driers for feeding an abrasive slurry into a fluidization-medium layer provided by mobilizing alumina-made or zirconia-made balls by means of hot blast. The spray drier is a type of driers for spraying an abrasive slurry into hot blast by means of a two-fluid nozzle or similar means. Through employment of such drying means, an abrasive micropowder exhibiting excellent re-dispersion property and polishing performance can be provided.

The abrasive of the present invention is dispersed, in a desired concentration, in the aforementioned dispersion medium for producing a slurry, to thereby produce the abrasive slurry of the present invention.

Generally, no particular limitation is imposed on the substrates to which the abrasive slurry of the present invention can be applied. The abrasive slurry is used for finish-polishing of a variety of optical, electronics glass material, customary glass products, etc. Specific examples include glass substrates for optical lenses; glass substrates for optical or magnetic disks; glass substrates for plasma-display devices; glass substrates for liquid crystal displays such as thin-film transistor (TFT) type LCDs and twisted nematic (TN) type LCDs; and glass substrates for color filters of liquid crystal television displays and LSI photomasks.

Preferably, the abrasive slurry of the present invention is used specifically to polish a glass substrate for magnetic disks. The glass substrate for magnetic disks has become of interest in that the substrate has advantages such as a high rigidity for allowing thickness reduction and a high impact resistance, and glass materials—generally divided into chemically reinforced glass and glass ceramics—are used for providing the substrate. Each of these glass materials has been subjected to reinforcement treatment in order to overcome an intrinsic drawback of glass; i.e., fragility. Since scratches occurring in the glass surface usually cause a great decreases in mechanical strength, the glass substrate undergoes chemical reinforcement through ion exchange for enhancing reliability of a disk produced from the substrate. Specifically, a glass substrate (disk substrate) is immersed in an alkaline molten salt, to thereby exchange alkali ions present in the glass surface with ions of a larger size present in the molten salt, leading to formation, in the glass surface layer, of a compressive stress layer which greatly enhances fracture strength. In such a chemically reinforced glass substrate, elution of alkali species from the glass is prevented. The abrasive slurry of the present invention attains excellent polishing performance (in terms of surface roughness, scratches, surface defects, etc. of a substrate) to a substrate for HDs formed of the aforementioned chemically reinforced glass material. Examples of preferably employed glass substrates for HDs include aluminosilicate glass substrates containing $Li^+$ and $Na^+$, sodalime glass substrates containing $K^+$ and $Na^+$, and glass ceramic substrates.

BEST MODES FOR CARRYING OUT THE INVENTION

The present invention will next be described in detail by way of examples, which should not be construed as limiting the invention thereto.

EXAMPLE 1

Commercially available crude rare earth metal carbonate powder (ignition loss: 55.8%) (4 kg) was fired in a box-shape electric furnace. The following firing conditions were employed; temperature elevation rate of 1.7° C./min, firing temperature of 900° C., and retention time of two hours. Elemental analysis of the thus-fired powder revealed that the rare earth metal element content was 99 mass % and the cerium oxide concentration based on all rare earth metal elements was 60 mass %. The specific surface area of the thus-produced fired powder, as measured by means of a BET specific surface area measurement apparatus, was 10 $m^2/g$.

The thus-obtained fired powder (1.7 kg) was added to pure water (2.5 kg), and the resultant mixture was stirred. Subsequently, an anionic surfactant (polycarboxylic acid compound surfactant (Kao Poiz 530, product of Kao Corporation)) (34 g) serving as a dispersant was added in an amount of 2 mass % based on the fired powder, and the mixture was stirred, to thereby yield a slurry. The thus-yielded slurry was subjected to wet-milling for 2.5 hours while the slurry was caused to circulate in the wet-milling apparatus. After completion of wet-milling, pure water was added to the slurry, to thereby yield 8 kg of an abrasive slurry (concentration 20 mass %). The slurry was found to have an electrical conductivity of 3.5 mS/cm at 20.5° C.

A portion of the obtained abrasive slurry was subjected to particle size measurement by means of a laser-diffraction particle size distribution measurement apparatus (HR 850, product of CILAS). The volume-cumulative (50%) average particle size (D50) was found to be 0.55 µm, and the volume-cumulative (95%) average particle size (D95) was found to be 0.8 µm, with the ratio D95/D50 being 1.5. Furthermore, the percent amount of coarse particles having a size more than 10 times the volume-cumulative (50%) average particle size (D50); i.e., 5.5 µm, was found to be 0.72 mass % based on the total mass of all the particles.

By use of the thus-obtained abrasive slurry, the below-described object to be processed was polished. The polishing machine and the polishing pad employed were a 4-way double-sided polishing machine (Model 5B, product of Fujikoshi Kikai Kogyo) and a suede-type pad (Politex DG, product of Rodel), respectively. Polishing was performed under the following conditions: feed rate of slurry of 60 ml/min, number of revolutions of the turntable of 90 rpm, operation pressure of 75 g/cm$^2$, and polishing time of 10 minutes. After completion of polishing, the reinforced glass substrate was removed from the polishing machine, washed by use of pure water under ultrasound application, and dried. The glass substrate was evaluated in terms of the following properties. Table 2 shows the results.

In the above polishing, a 2.5-inch-size reinforced glass (aluminosilicate-base) substrate (surface roughness Ra=9 Å) for magnetic disks was used as an object to be processed (object to be polished). The substrate had been polished in advance by use of a commercially available cerium oxide abrasive (ROX H-1, product of Tohoku Kinzoku Kagaku K.K.).

Evaluation of the Processed Object
(1) Surface Roughness (Ra)

The surface roughness (Ra) of the glass substrate was measured by means of a contact-type surface roughness measurement apparatus (Talystep or Talydata 2000, product of Rank-Taylor Hobson).

(2) Surface Defects

The surface of the glass substrate was observed under a differential interference microscope, and the surface evaluated in terms of adhesion onto the surface and generation of scratches and pits. The incidence of scratches was evaluated by the number of scratches occurring in the surface of the glass substrate. The incidence of surface defects was evaluated on the basis of three relative ratings; i.e., "○" (no substantial pits, favorable surface conditions); "Δ" (small numbers of pits, problematic in actual use); and "X " (considerably poor surface conditions).

(3) Removal Rate

The removal rate (µm/min) was calculated from the change in weight of the glass substrate before and after polishing.

EXAMPLES 2 TO 7

The procedure of Example 1 was repeated, except that D50, D95, and the coarse particle content were changed to the values as shown in Table 1 by appropriately modifying firing conditions and conditions of wet-milling apparatus operation, to thereby produce abrasive slurries. Each slurry was evaluated in a manner similar to Example 1. Table 2 shows the results.

EXAMPLES 8 AND 9

The procedure of Example 1 was repeated, except that the slurry concentration was changed to 10 mass % (represented by wt. % in Table 1) or 40 mass %, to thereby produce abrasive slurries. Each slurry was evaluated in a manner similar to Example 1. Table 2 shows the results.

EXAMPLES 10 AND 11

The procedure of Example 1 was repeated, except that the amount of the added dispersant was changed as shown in Table 1, to thereby produce abrasive slurries. Each slurry was evaluated in a manner similar to Example 1. Table 2 shows the results.

COMPARATIVE EXAMPLE 1

The procedure of Example 1 was repeated, except that the wet milling was completed at one hour after the initiation, to thereby produce an abrasive slurry. The obtained fired powder was found to have a D50 of 0.55 µm and a D95 of 1.8 µm, and the slurry (concentration of 20 mass % adjusted after milling) was found to have a pH of 11.9.

The thus-obtained slurry was evaluated in a manner similar to that employed in Example 1. Table 2 shows the results.

COMPARATIVE EXAMPLES 2 TO 6

The procedure of Example 1 was repeated, except that BET specific surface area, D50, D95, and the coarse particle content were changed to the values as shown in Table 1 by appropriately modifying firing conditions and conditions of wet-milling apparatus operation, to thereby produce abrasive slurries. Each slurry was evaluated in a manner similar to Example 1. Table 2 shows the results.

EXAMPLE 12

The procedure of Example 1 was repeated, except that commercially available high-purity cerium oxide was used instead of a rare earth metal carbonate, to thereby yield high-purity cerium oxide (ceria 97%). The thus-obtained fired powder was found to have a specific surface area of 12 m$^2$/g.

The thus-obtained fired powder (1.7 kg) was added to pure water (2.5 kg), and to the resultant mixture, a dispersant (Kao Poiz 530, trade name) (34 g) and 10% aqueous ammonia (10 g) were added, and the resultant matter was stirred, to thereby yield a slurry. In a manner similar to that employed in Example 1, an abrasive slurry was prepared from the slurry, and subjected to evaluation. Table 2 shows the results.

EXAMPLES 13 AND 14

The procedure of Example 12 was repeated, except that, as shown in Table 1, iron oxide ($Fe_2O_3$) or silicon oxide ($SiO_2$) was used instead of high-purity cerium oxide, to thereby yield respective abrasive slurries. The pH of each slurry was adjusted by adding caustic soda. The slurry was found to have a BET specific surface area, D95/D50, or other properties as shown in Table 1. The slurries were evaluated in a manner similar to that employed in Example 12. Table 2 shows the results.

EXAMPLE 15

A cerium oxide abrasive slurry (containing an anionic surfactant) which had been obtained in a manner similar to that employed in Example 1 was dried by means of a medium-fluidization drier, to thereby yield an abrasive micropowder. Specifically, the abrasive slurry was fed, under control of the feeding amount, into a slurry drier (Model SFD-05, product of Okawara Seisakusho) in which zirconia balls (φ2 mm, 20 kg) were charged in order to dry the slurry, to thereby yield an abrasive micropowder. The abrasive micropowder was dispersed in water such that the concentration reached 10 mass %, and the resultant dispersion was stirred for one hour. After completion of stirring, the dispersion was ultrasonicated for 10 minutes. Subsequently, the dispersion was allowed to pass through a 20 μm microsieve, and the weight of the particles remaining on the sieve was measured so as to check the aggregation state. On the sieve, only 5 mass % of the abrasive micropowder that had been charged was found to remain. By use of such an abrasive micropowder, a cerium oxide abrasive slurry can be obtained with good reproducibility.

As is apparent from Table 1 and 2, when any of abrasive slurries of Examples 1 to 14 is employed in polishing, there can be attained a high removal rate and a favorable polished surface having low surface roughness and few scratches or surface defects.

In contrast, when polishing is performed by use of any of abrasive slurries of Comparative Examples 1 to 6, at least one of surface roughness, scratch generation, and surface defects is unsatisfactory, failing to attain a high-quality polished surface. In addition, abrasive slurries of Comparative Examples 2 and 3 have been found to provide a low removal rate when used in polishing.

TABLE 1

| | Raw material used | BET of fired powder | Particle size of milled powder (μm) | | | Coarse particle content | Slurry concentration | Amount of dispersant added | Slurry pH |
|---|---|---|---|---|---|---|---|---|---|
| | | | $D_{50}$ | $D_{95}$ | $D_{95}/D_{50}$ | | | | |
| Ex. 1 | RE carbonate | 10 m²/g | 0.55 | 0.85 | 1.5 | 0.72 wt. % | 20 wt. % | 2 wt. % | 12.1 |
| Ex. 2 | RE carbonate | 10 | 0.55 | 1.20 | 2.2 | 0.88 | 20 | 2 | 12.3 |
| Ex. 3 | RE carbonate | 10 | 0.55 | 0.70 | 1.3 | 0.68 | 20 | 2 | 12.1 |
| Ex. 4 | RE carbonate | 10 | 0.80 | 1.50 | 1.9 | 0.92 | 20 | 2 | 12.2 |
| Ex. 5 | RE carbonate | 10 | 0.40 | 1.00 | 2.5 | 0.82 | 20 | 2 | 12.4 |
| Ex. 6 | RE carbonate | 5 | 0.59 | 0.92 | 1.6 | 0.70 | 20 | 2 | 12.1 |
| Ex. 7 | RE carbonate | 7 | 0.57 | 0.88 | 1.5 | 0.72 | 20 | 2 | 12.3 |
| Ex. 8 | RE carbonate | 10 | 0.55 | 0.85 | 1.5 | 0.78 | 10 | 2 | 12.3 |
| Ex. 9 | RE carbonate | 10 | 0.55 | 0.85 | 1.5 | 0.69 | 40 | 2 | 12.2 |
| Ex. 10 | RE carbonate | 10 | 0.55 | 0.85 | 1.5 | 0.77 | 20 | 1 | 12.2 |
| Ex. 11 | RE carbonate | 10 | 0.55 | 0.85 | 1.5 | 0.86 | 20 | 5 | 12.1 |
| Ex. 12 | High-purity $CeO_2$ | 12 | 0.57 | 0.77 | 1.35 | | 20 | 2.0 | 10.1 |
| Ex. 13 | $Fe_2O_3$ | 15 | 0.25 | 0.49 | 2.0 | | 20 | 2.5 | 10.5 |
| Ex. 14 | $SiO_2$ | 40 | 0.11 | 0.28 | 2.5 | | 20 | 3 | 10.2 |
| Comp. Ex. 1 | RE carbonate | 10 m²/g | 0.55 | 1.80 | 3.3 | 1.24 wt. % | 20 wt. % | 2 wt. % | 11.9 |
| Comp. Ex. 2 | RE carbonate | 2 | 1.20 | 3.8 | 3.2 | 2.15 | 20 | 2 | 11.8 |
| Comp. Ex. 3 | RE carbonate | 2 | 0.80 | 3.1 | 3.9 | 1.30 | 20 | 2 | 11.8 |
| Comp. Ex. 4 | RE carbonate | 22 | 0.50 | 2.5 | 5.0 | 1.22 | 20 | 2 | 10.2 |
| Comp. Ex. 5 | RE carbonate | 22 | 0.54 | 0.95 | 1.8 | 1.78 | 20 | 1 | 9.6 |
| Comp. Ex. 6 | RE carbonate | 10 | 0.55 | 0.85 | 1.5 | 2.50 | 20 | none | 8.5 |

TABLE 2

| | Conductivity of slurry (mS/cm) | Removal rate (μm/min) | Surface roughness (Ra) (Å) | Scratches (relative incidence) (no./sheet) | Surface defects (relative evaluation) |
|---|---|---|---|---|---|
| Ex. 1 | 3.5 | 0.71 | 4.2 | 30 | ○ |
| Ex. 2 | 3.5 | 0.75 | 4.3 | 35 | ○ |
| Ex. 3 | 3.5 | 0.70 | 4.1 | 27 | ○ |
| Ex. 4 | 3.5 | 0.82 | 4.4 | 40 | ○ |
| Ex. 5 | 3.4 | 0.70 | 4.2 | 33 | ○ |
| Ex. 6 | 3.6 | 0.80 | 4.5 | 30 | ○ |
| Ex. 7 | 3.5 | 0.76 | 4.3 | 30 | ○ |
| Ex. 8 | 3.6 | 0.72 | 4.2 | 30 | ○ |
| Ex. 9 | 3.5 | 0.71 | 4.2 | 32 | ○ |
| Ex. 10 | 3.1 | 0.70 | 4.2 | 33 | ○ |

TABLE 2-continued

| | Conductivity of slurry (mS/cm) | Removal rate (μm/min) | Surface roughness (Ra) (Å) | Scratches (relative incidence) (no./sheet) | Surface defects (relative evaluation) |
| --- | --- | --- | --- | --- | --- |
| Ex. 11 | 3.6 | 0.68 | 4.1 | 34 | ◯ |
| Ex. 12 | 3.3 | 0.73 | 4.0 | 22 | ◯ |
| Ex. 13 | 3.6 | 0.49 | 4.7 | 55 | ◯ |
| Ex. 14 | 3.2 | 0.31 | 2.5 | 18 | ◯ |
| Comp. Ex. 1 | 2.8 | 0.76 | 4.7 | 105 | X |
| Comp. Ex. 2 | 2.8 | 0.85 | 5.2 | 150 | X |
| Comp. Ex. 3 | 2.8 | 0.83 | 5.0 | 130 | X |
| Comp. Ex. 4 | 2.6 | 0.63 | 4.7 | 39 | Δ |
| Comp. Ex. 5 | 2.1 | 0.78 | 5.5 | 120 | X |
| Comp. Ex. 6 | 1.8 | not measurable | not measurable | not measurable | X |

INDUSTRIAL APPLICABILITY

As described hereinabove, according to the present invention, there can be provided an abrasive slurry which attains, during accurate polishing of electronics substrates, particularly glass substrates for magnetic disks, a high removal rate and a high-quality surface; i.e., a surface having a high flatness, low surface roughness, and substantially no microscratches or micropits.

What is claimed is:

1. An abrasive having a D95 of 0.1–1.5 μm and containing coarse particles having a size more than 10 times D50 in an amount, based on the total mass of all the particles, of 1 mass % or less, wherein the abrasive contains, as a predominant component, at least one species selected from the group consisting of cerium oxide, silicon oxide, iron oxide, aluminum oxide, and titanium oxide.

2. An abrasive as described in claim 1, wherein the D50 is from 0.01 to 10 μm.

3. An abrasive as described in claim 1, which has a specific surface area of 1–50 m$^2$/g.

4. An abrasive as described in claim 3, which contains, as a predominant component, cerium oxide produced from a rare earth metal carbonate serving as a starting material.

5. An abrasive as described in claim 1, which contains a predominant component in an amount of at least 50 mass %.

6. An abrasive slurry comprising an abrasive as described in claim 1 in an amount of 1–50 mass % and a solvent.

7. An abrasive slurry as described in claim 6, which has a pH in excess of 10.

8. An abrasive slurry as described in claim 6, which has an electrical conductivity of at least 2 mS/cm as measured at 20° C. under an abrasive concentration of 20 mass %.

9. An abrasive slurry as described in claim 6, which has an electrical conductivity of at least 3 mS/cm as measured at 20° C. under an abrasive concentration of 20 mass %.

10. An abrasive slurry as described in claim 6, which contains a surfactant.

11. An abrasive slurry as described in claim 6, which contains at least one species selected from the group consisting of an anionic surfactant and a nonionic surfactant.

12. An abrasive slurry as described in claim 6, which contains, as an anionic surfactant, at least one species selected from the group consisting of low-molecular compounds and high-molecular compounds of a carboxylate salt, a sulfonate salt, a sulfate ester salt, or a phosphate ester salt.

13. An abrasive slurry as described in claim 6, which contains, as a nonionic surfactant, at least one species selected from the group consisting of a polyoxyethylene alkylphenol ether, a polyoxyethylene alkyl ether, and a polyoxyethylene fatty acid ester.

14. An abrasive slurry as described in claim 6, which contains, as a solvent, at least one species selected from the group consisting of water, a C1–C10 monohydric alcohol, a glycol, a C1–C10 polyhydric alcohol, dimethyl sulfoxide, dimethylformamide, tetrahydrofuran, and dioxane.

15. An abrasive slurry as described in claim 6, which contains at least one species selected from the group consisting of a phosphate salt, a cellulose ether, and a water-soluble polymer.

16. A method for producing an abrasive comprising a step of drying an abrasive slurry as recited in claim 6 and a step of pulverization.

17. A method for producing an abrasive comprising a step of drying an abrasive slurry as recited in claim 6 and a step of pulverization, wherein the step of drying employs a fluidization-medium drier or a spray drier.

18. A method for producing an abrasive comprising a step of drying an abrasive slurry as recited in claim 6 and a step of pulverization, wherein the step of drying is performed in a manner in which the abrasive slurry is fed into a fluidization-medium layer of a fluidization-medium drier or in a manner in which the abrasive slurry is sprayed into a hot blast provided in a spray drier.

19. A polishing method comprising polishing, by use of an abrasive slurry as recited in claim 6, a substrate selected from the group consisting of glass substrates for an optical lense, an optical disk, a plasma-display device, a liquid crystal device, a color filter for a liquid crystal television, and an LSI photomask.

20. A polishing method comprising polishing, by use of an abrasive slurry as recited in claim 6, a glass substrate for a magnetic disk.

21. An abrasive as described in claim 1, which has a ratio of volume-cumulative (95%) average particle size (D95) to volume-cumulative (50%) average particle size (D50) (D95/D50) of 1.2 to 3.0.

22. An abrasive as described in claim 21, wherein the D50 is from 0.01 to 10 μm.

23. An abrasive as described in claim 21, which has a specific surface area of 1–50 m$^2$/g.

24. An abrasive as described in claim 21, which contains, as a predominant component, cerium oxide produced from a rare earth metal carbonate serving as a starting material.

25. An abrasive as described in claim 21, which contains a predominant component in an amount of at least 50 mass %.

* * * * *